No. 782,449. PATENTED FEB. 14, 1905.
J. H. JOHNSON.
CORN HARVESTING MACHINE.
APPLICATION FILED MAY 29, 1902.

Witnesses:
S. C. Duvall.
R. E. Randle.

Inventor,
JESSIE H. JOHNSON,
by his attorney,
Robert W. Randle.

No. 782,449. PATENTED FEB. 14, 1905.
J. H. JOHNSON.
CORN HARVESTING MACHINE.
APPLICATION FILED MAY 29, 1902.

Witnesses:
S. C. Duvall
R. E. Randle

Inventor:
JESSIE H. JOHNSON,
by his attorney,
Robert W. Randle.

No. 782,449. PATENTED FEB. 14, 1905.
J. H. JOHNSON.
CORN HARVESTING MACHINE.
APPLICATION FILED MAY 29, 1902.

Witnesses:
S. C. Duvall.
R. E. Randle.

Inventor,
JESSIE H. JOHNSON,
by his attorney,
Robert W. Randle

No. 782,449.   Patented February 14, 1905.

UNITED STATES PATENT OFFICE.

JESSIE H. JOHNSON, OF NEW PARIS, OHIO.

CORN-HARVESTING MACHINE.

SPECIFICATION forming part of Letters Patent No. 782,449, dated February 14, 1905.

Application filed May 29, 1902. Serial No. 109,504.

*To all whom it may concern:*

Be it known that I, JESSIE H. JOHNSON, a citizen of the United States, residing at New Paris, in the county of Preble and State of Ohio, have invented new and useful Improvements in Corn-Harvesting Machines, of which the following is a specification, which is a full, clear, and exact description of the invention, such as will enable others skilled in the art to which it appertains to make and use the same.

My present invention relates to corn cutting and husking machines, or for severing the standing stalks, elevating the severed parts, separating the ears of corn from the severed stalks, and for removing the husks from the severed ears of corn.

The object of my invention, broadly speaking, is the provision of an improved machine of the class stated which will automatically sever standing stalks of corn or the like, sever the ears of corn from the stalks, remove the husks from the ears, and place the ears in a receptacle provided for that purpose.

Another object is the provision of a corn-harvesting machine of new and novel construction, neat and attractive in appearance, strong and durable in its construction, capable of a wide scope of efficiency and usefulness, and which can be manufactured and sold at a comparatively low price.

Other objects and advantages will appear from the following specification and from the drawings forming a part thereof, hereinafter referred to.

I attain the above and other objects by the arrangement and combination of the several parts illustrated in the drawings and hereinafter fully described and pointed out in the claims terminating this specification.

The invention consists in a corn-harvesting machine embodying certain novel and peculiar features and details of construction, combinations, and relative disposition of parts, as hereinafter particularly set forth, illustrated in the drawings, and specifically pointed out in the claims hereunto appended.

To accomplish the foregoing objects and others not specifically mentioned, I provide a framework mounted on a pair of supporting drive-wheels, a common axle on which said wheels are mounted and by which it is adapted to be rotated for operating the various mechanisms, also an improved mechanism for gathering the standing corn to the desired cutting-point, and an improved knife and operating mechanism therefor for severing the stalks of corn, a mechanism for carrying the corn to the elevating-belts, a novel mechanism for elevating the severed stalks and corn attached thereto for depositing it on a carrying device, of the carrying device for carrying the stalks and corn to the stripping-rollers, means for removing the ears of corn from the stalks and for carrying the stalks to the rear and for depositing them in bunches, the mechanism for stripping the husks from the ears of corn, and the mechanism for elevating the husked ears of corn and depositing them in a receptacle of novel construction, whereby they may be deposited in gavels on the earth or in a vessel.

My improved devices are primarily intended to be used in combinations substantially as herein shown and described as appurtenant to a corn-harvesting machine; but I do not limit my improved devices to use in such machines, as it is evident that they can be employed with advantage in other machines and can be used for other purposes. The accomplishment of any two of the combinations herein described would improve the present type of machines of this character, since each is largely dependent upon the other for its most material advantages. In fine, all are closely related and interdependent.

Persons familiar with the cultivation and harvesting of corn are aware that corn is usually planted in hills at intervals apart, which contain from three to five stalks, and for this reason a cutting apparatus must be employed which will sever a number of stalks within a very short distance of space of the forward movement of the machine, and for this reason the machine, and especially the cutting apparatus, must be capable of withstanding the enormous strain and constant repetitions thereof followed by periods when the cutting apparatus is doing no work as the machine proceeds, and I have had the above requirements in view in the construction of my machine.

For a detail description of my invention I will now refer to the accompanying drawings, forming a part of this specification, in which—

Like characters of reference denote and refer to like parts throughout the several views.

The terms "upward," "downward," "right," "left," "front," "rear," and other similar terms, as will hereinafter appear, are simply used for convenience of description, and it is not intended by the use of such terms to limit the invention or its operation to the positions indicated. In the use of said terms it is to be considered that the directions are taken from the position of the driver's seat and facing toward the tongue of the machine.

In the drawings, 1 indicates the main shaft, which supports the machine and from which and by which the various mechanisms are operated.

2 represents the right drive-wheel, and 3 the left drive-wheel. These are mounted on the ends of the shaft 1 by any well-known method and are adapted to revolve the shaft 1 forward when desired, but not backward, by means of a mechanism which will hereinafter be explained.

Mounted on the shaft 1 and supported thereby is the main framework, which consists of the right end sill 4, the left end sill 5, the front sill 6, and the rear sill 7, all of which members are securely fastened together, forming a parallelogram frame. Rising from said frame and at right angles thereto are the posts, located as follows: the left front post 11, the central front post 12, the left rear post 13, the central rear post 14, the right rear post 15, and the right front post 16. The lower ends of these are securely fastened to the frame already referred to, and their extension upward varies according to the requirements of the mechanisms located near or in conjunction with them. The right front post 16 is considerably shorter than the rear post 15, and secured on the tops of the posts 15 and 16 is a guide-board 17, provided with a pointed forward end, and on the same plane therewith is an oppositely-disposed guide-board 18 of similar form, which extends the same distance forward, but only a little more than one-half the distance to the rear, as does the guide 17. Extending out from the sill 6, near the right end thereof, are the two members 19 and 20, the forward ends of which are secured to and support the forward ends of 17 and 18, respectively. The rear end of 18 is supported by the brace 21, which extends therefrom and is secured to the upper face of 20. Secured between the members 19 and 20 on a level therewith, its rear end abutting the sill 6, is the member 22, its forward end being V-shaped, and this V-shaped edge is reinforced with metal member 23, forming a vortex 24.

The figure 8 represents the tongue of the machine, 9 the driver's seat, and 10 the seat post or support.

Figures 11, 12, 13, 14, 15, 16, 17:
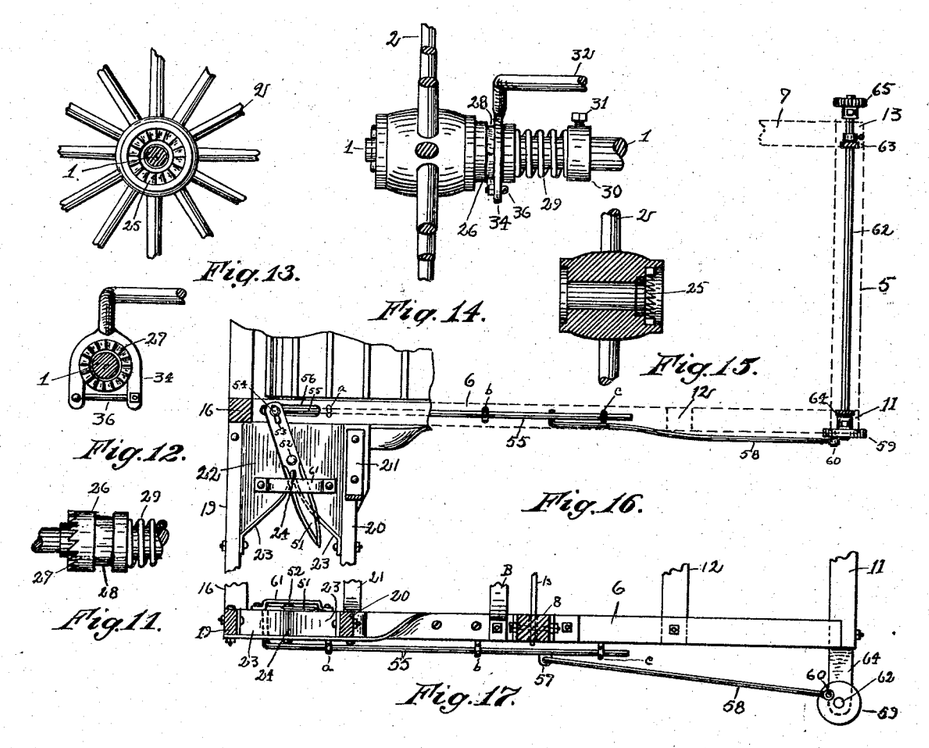
Fig. 11 is a detail side view of a portion of the main shaft, of one of the ratchet-sleeves, and of one of the ratchet-operating springs.
Fig. 12 is a detail end view of a section of the main shaft and one of the ratchet-sleeves, also an elevation of a portion of the forked gear-lever.
Fig. 13 is a detail end view of the inside center portion of one of the drive-wheels, showing the ratchet-rack on the interior of the hub.
Fig. 14 is a detail elevation of a portion of one of the drive-wheels, the main shaft, the forked lever, and also one of the ratchet-sleeves, one of the springs, and one of the collets.
Fig. 15 is a detail longitudinal section of one of the hubs of the drive-wheels.
Fig. 16 is a detail top plan of the cutting mechanism, showing its construction and means of operation.
Fig. 17 is a front elevation of the same.

*Ratchet mechanism.*—The inner face of the hub of each drive-wheel is provided with a ratchet-rack 25, Figs. 13 and 15, facing inward and adjoining the periphery of the shaft 1. Opposite thereto and surrounding the shaft 1 is a ratchet-collet 26, the outer end of which is adapted to enter the inner end of the hub and is provided with an oppositely-disposed ratchet-rack 27, which is adapted to engage with the rack 25. The collet 26 surrounds the shaft 1 and is adapted to slide laterally a limited distance thereon, but is at all times carried revolubly in unison therewith. Near the inner end of 26 and around its periphery I provide a channel 28, and contacting with the inner end of 26 and surrounding the shaft 1 is a coil-spring 29, and contacting with the latter on the inner end is a collet 30, which is secured to the shaft 1 at the point desired by the set-screw 31. The rack 27 is held normally in contact with the rack 25 by the spring 29, and the amount of pressure is governed by the location of the collet 30 on the shaft 1. The parts shown in detail in Figs. 11, 12, 13, 14, and 15 are exact duplicates of similar parts on either side of the machine, and a description of one as above given answers for both, and these duplicate parts are referred to by the same reference numbers in the other views. It is apparent that if the wheels 2 and 3 be revolved forward the mechanism just described will cause the shaft 1 to revolve forward, but if the wheels 2 and 3 be revolved backward the shaft 1 will not be revolved, and also that if in turning the machine one of the wheels—for instance, wheel 3—remain stationary as a pivotal point and the other wheel, 2, be moved forward around wheel 3 the shaft 1 will be revolved forward as though both wheels were moving forward in unison.

At certain times it may be desirable that the machine be moved forward without revolving the shaft 1 and the mechanism depending thereon, and for this reason and to provide means for quickly and easily throwing the machine in and out of gear I provide a mechanism which I will describe.

Figure 5:
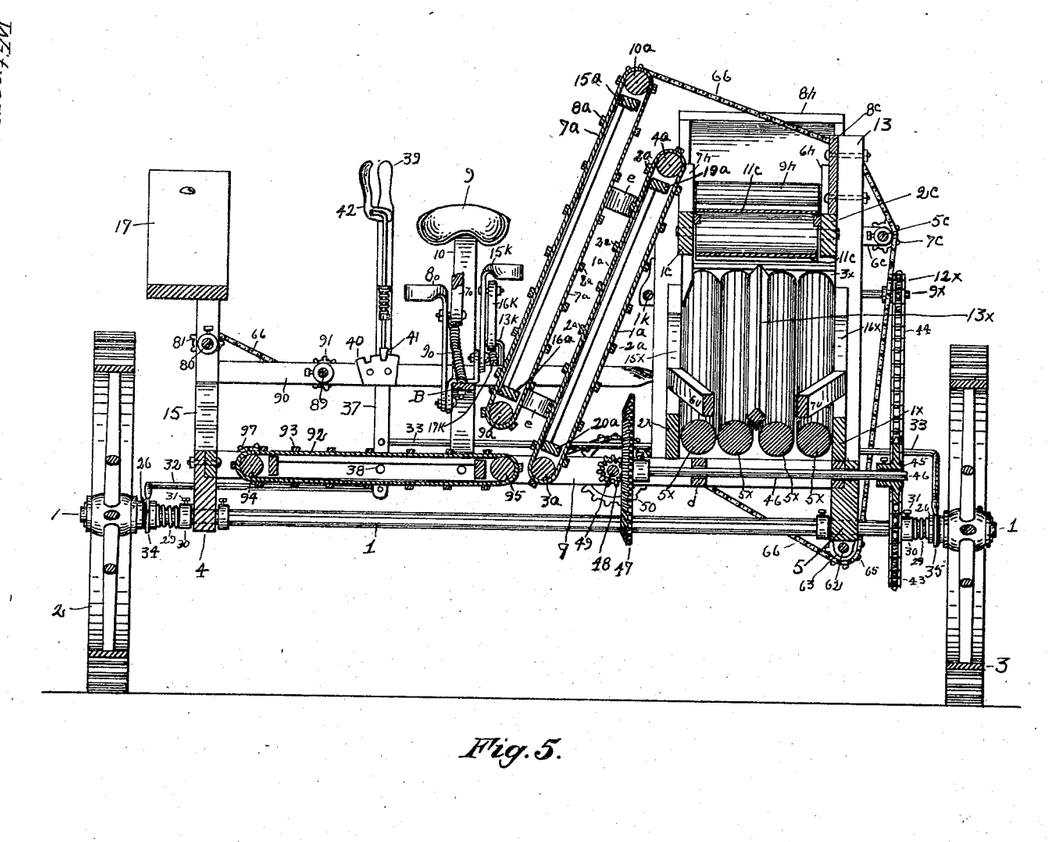
Fig. 5 is a transverse cross-section of my machine, taken on the lines X X of Figs. 2 and 4.

*Mechanism for throwing the machine in and out of gear.*—This consists of the two rods 32 and 33, the outer ends of each being forked and bent downward at right angles thereto, forming the forks 34 and 35, which are adapted to engage in the respective channels 28 and are loosely locked in engagement therewith by the bolts 36. The inner ends of the rods 32 and 33 are pivotedly connected to the perpendicular lever 37. The lever 37 is pivotally mounted to the bolt 38 as a fulcrum, and the inner ends of the rods 32 and 33 are attached to 37, one above and one below the fulcrum 38 and an equal distance therefrom. The handle 39 of the lever 37 is adapted to be moved to the right or left, and by means of the permanent rack 40 and the plunger 41, operated vertically by the auxiliary lever 42, it can be made to occupy one of two positions. As shown most clearly in Fig. 5, the machine is in gear, and consequently the shaft 1 would revolve if the wheels 2 and 3 should be revolved forward; but should the plunger 41 be lifted up and the lever 39 moved to the left, so that the plunger 41 would enter the left notch in rack 40, the forks 34 and 35 will then have withdrawn the respective ratchet-faces 27 from contact and engagement with the ratchet-faces 25 and the machine will be out of gear, so that the drive-wheels 2 and 3 may be revolved without revolving the shaft 1.

*Main sprocket mechanism.*—Permanently secured to the shaft 1, near the left end thereof and adjoining the inner face of the left collet 30, is the main sprocket-wheel 43, which carries the sprocket-chain 44, the latter passing over the sprocket-wheel 45, which latter is secured to the outer end of the shaft 46. The shaft 46 is mounted in suitable boxings in the end sill 5 and the cross-sill *d*. Secured to the inner end of the shaft 46 is the bevel gear-wheel 47, meshing with the smaller bevel gear-wheel 48, which latter is at right angles to the wheel 47 and is operated thereby. The bevel-wheel 48 is secured to the front end of the shaft 49, which latter extends to the rear of the machine beyond the sill 7, to which it is journaled, at which point the sprocket-wheel 50 is secured to it.

*Cutting mechanism.*—The figure 51 represents a cuspidal cutting-knife which is provided with a double cutting edge extending from the point of the knife to near the center of the length thereof. The cutting edges are produced by a bevel grinding from the upper side of the knife only. The knife 51 is pivotally mounted near its center to the V-shaped block 22 by the bolt 52, located in the rear of and opposite the vortex 24. Through the rear end of the knife 51 I provide a slot 53 to receive the bolt 54, by which the knife is connected to the connecting-rod 55 and is vibrated thereby. The rod 55 is adapted to slide laterally in its guide-hangers *a*, *b*, and *c* to a distance about the length of the slot 56 in the sill 6. To the rod 55 I secure an eyelet 57, in which I pivotally mount one end of the pitman-rod 58. The other end of the pitman-rod 58 is secured pivotally on the face of the crank-wheel 59, near the edge thereof, by the crank-pin 60. It is now apparent that should the wheel 59 be revolved the rear end of the knife 51 will be given a vibratory lateral motion and the point of the knife 51 will be given a corresponding vibratory lateral motion; but the movement of the forward part of the knife will be oppositely timed to the movement of the rear end of the knife.

61 represents a guard extending over the center portion of the knife 51, and it is secured to the V-shaped block 22 by bolts, as shown, and is designed to prevent the vortex 24 from becoming clogged or choked.

The crank-wheel 59 is secured to the forward end of the shaft 62, which shaft is journaled in hangers 63 and 64, and to the rear end of the shaft 62 a sprocket-wheel 65 is secured, which latter is in alinement with the wheel 50 and is operated thereby, as will hereinafter appear.

Figure 3:
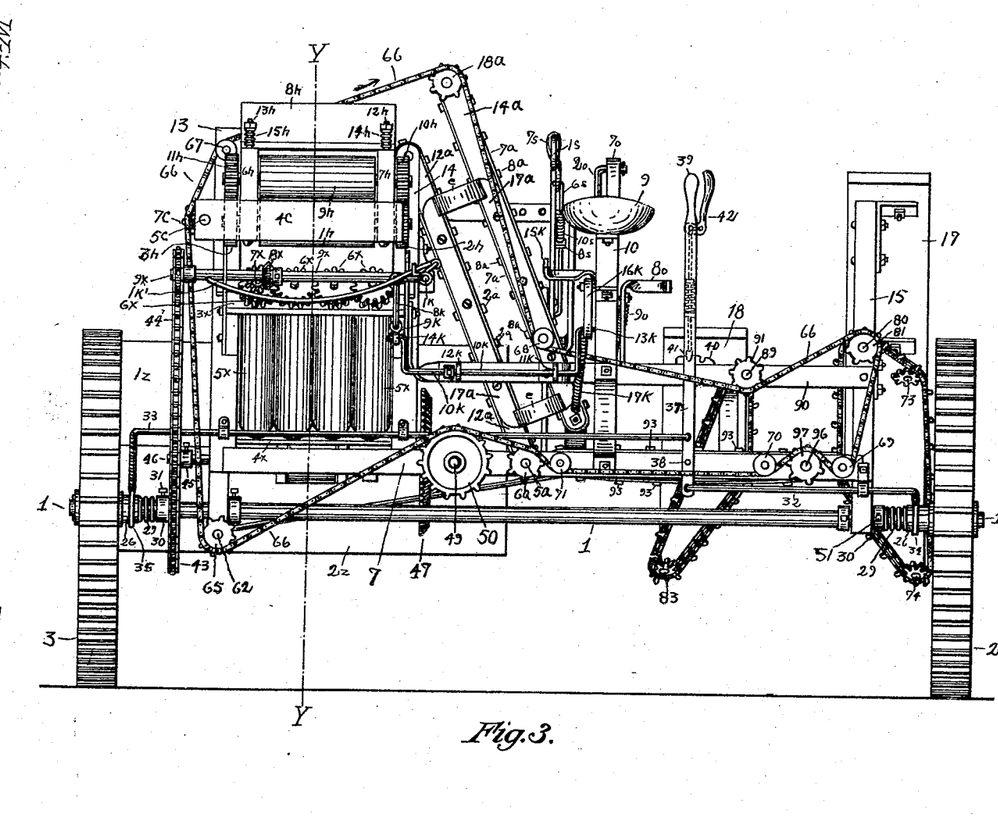
Fig. 3 shows a rear elevation of same.

*Rear-sprocket chain.*—As shown particularly in Fig. 3, I have provided an endless sprocket-chain 66, which passes over the main sprocket-wheel 50 and is operated thereby and which transmits power to operate various mechanisms which will hereinafter appear. In order to contact the sprocket-chain 66 with the various sprocket-wheels which it operates, I have provided a number of loose pulleys mounted to convenient parts of the framework of the machine, and these are represented by the numerals 67, 68, 69, 70, and 71, respectively. One or more of said pulleys may be made movable for the purpose of adjusting the sprocket-chain 66 to the proper tension when desired.

*Corn-receiving mechanism.*—Revolubly mounted on the under side of the guide-board 17 are a number of small sprocket-wheels for which the bolts 72, 73, 74, and 75 act as axles or journals, and on said sprocket-wheels is mounted the sprocket-chain 76. Each alternate link of the chain 76 is provided with a projecting spur (represented by numeral 77) for the entire length of said chain, which spurs 77 are set at an angle inclining toward the direction in which the chain travels. Secured to the sprocket-wheel mounted on the bolt 72 is a bevel gear-wheel 78, by which the chain 76 is moved. The bevel gear-wheel 78 meshes with the bevel gear-wheel 79, which latter is secured on the shaft 80. The forward end of the shaft 80 is journaled to the post 16, and the rear end of shaft 80 is journaled to the post 15, beyond which it projects, where it is provided with a sprocket-wheel 81, over which latter passes the sprocket-chain 66, reaching to the main sprocket-wheel 50, by which it is operated. A similar mechanism is provided opposite the one just described and an equal distance from the vortex 24, except that this does not extend so far to the rear. It consists of the journal-bolts 82, 83, and 84, on which revolves the three sprocket-wheels which carry the sprocket-chain 85. The sprocket-chain 85 is also provided with projecting spurs 86 its entire length, which spurs are set at an angle inclining upward toward the direction in which the chain travels. Secured to the sprocket-wheel mounted on the bolt 82 is a bevel gear-wheel 87, by which the chain 85 is moved. The bevel gear-wheel 87 meshes with the bevel gear-wheel 88, secured on the shaft 89. The forward end of the shaft 89 is journaled in a boxing secured to the under part of the rear end of the guide-board 18, and the rear end is journaled in the brace 90. The brace 90 extends from the post 15 to the seat-post 10, and the rear end of the shaft 89 is provided with a sprocket-wheel 91, over which latter passes the sprocket-chain 66 and by which said mechanism is operated.

*Main conveying mechanism.*—Operating at right angles to the forward draft of the machine is the main conveying belt or apron 92, the upper surface of which travels toward the central part of the machine and across which at frequent intervals apart are secured the slats 93. The conveyer 92 is suspended on and is carried by two roller-shafts 94 and 95, the forward ends of which are journaled to the sill 6 and the rear ends in the sill 7. The rear end of 94 terminates in an axle 96, to which is secured the sprocket-wheel 97. The sprocket-wheel 97 is on alinement with the sprocket-wheel 50 and is operated by the sprocket-chain 66, which passes over it.

*Elevating mechanism.*—The fodder-elevating mechanism consists of two endless aprons extending from near the rear toward the front of the machine, placed at angles inclining toward the left parallel with each other and a short distance apart, and they consist, essentially, of two independent mechanisms operating in unison. The left-hand apron is represented by $1^a$ and is of same width and of similar construction as apron 92. The apron $1^a$ is also provided with slats or strips $2^a$, secured thereto at frequent distances apart, and is carried on the rollers $3^a$ and $4^a$. The roller $3^a$ is journaled at its front end in the sill 6 and at its rear end in the sill 7, where it is provided with an axle $5^a$, to which is secured the sprocket-wheel $6^a$, which latter is on alinement with the sprocket-wheel 50 and is connected to the sprocket-chain 66, which passes over it and by which the left apron is operated. The roller $3^a$ is on a level with the roller 95 and is a slight distance therefrom. The upper roller $4^a$ is journaled at its front end near the top of the post 12, and its rear end is journaled near the top of the post 14. Parallel with the elevation of the apron $1^a$ and secured to the top of the post 12 and extending to the sill 6, to which it is secured above the front end of the roller $3^a$, is a brace $11^a$, and opposite thereto and parallel therewith, on the rear of the machine, is the brace $12^a$, which extends from the top of the post 14 to the sill 7, where it is secured above the rear end of the roller $3^a$. The braces $11^a$ and $12^a$ are connected by the cross members $19^a$ and $20^a$, uniting them at the top and bottom, respectively.

The right apron is represented by $7^a$ and is of same size and proportions as the apron $1^a$ and is also provided with slats or strips $8^a$, secured thereto at frequent distances apart, and this apron is carried on the rollers $9^a$ and $10^a$. The rollers $9^a$ and $10^a$ are carried by and journaled to a framework lying parallel with the braces $11^a$ and $12^a$, which framework consists of the front member $13^a$, the rear member $14^a$, the top cross member $15^a$, and the bottom cross member $16^a$. This framework is secured to and supported by the braces $11^a$ and $12^a$ in connection with the members $16^a$ and $17^a$, which latter consists of two parallel portions, one of which is secured on the front and the other to the rear ends of the respective brace $11^a$ and member $13^a$ and the brace $12^a$ and member $14^a$, the respective parallel portions just referred to being united at the top and bottom by the outwardly-extending U-shaped portions $e$. The rear end of the roller $10^a$ terminates in an axle on which is secured the sprocket-wheel $18^a$, over which passes the sprocket-chain 66, by which it is revolved. By the arrangement just described the sides of the aprons $1^a$ and $7^a$ facing each other are caused to travel upward parallel with each other and at a uniform rate of speed. The roller $9^a$ is placed a short distance above the roller 95, for the reason that will hereinafter be apparent.

*Frame for the conveyer and for the snapping mechanism.*—Mounted to the posts 11, 12, 13, and 14 is a framework whose members lie at right angles to said posts, and it consists of the two parallel longitudinal members $1^c$ and $2^c$ and the cross members $3^c$ and $4^c$, secured thereto. This frame is provided for supporting the conveyer and the corn-snapping mechanism. The left ends of the cross members $3^c$ and $4^c$ extend beyond the member $2^c$, and the projecting ends are provided with bearings in which revolve the shaft $5^c$, and the center of the shaft $5^c$ revolves in a bearing in the support $6^c$, which latter is secured to the center of the member $2^c$. On the shaft $5^c$, between its center and the rear end, is secured a sprocket-wheel $7^c$, over which passes the chain 66 and by which said shaft is revolved. The member $1^c$ is parallel with and near the roller $4^a$ of the elevating device. Resting on top of the member $2^c$, parallel with and extending from the post 13 to beyond the post 11, is a guard-board $8^c$, secured to said posts.

Figure 6:
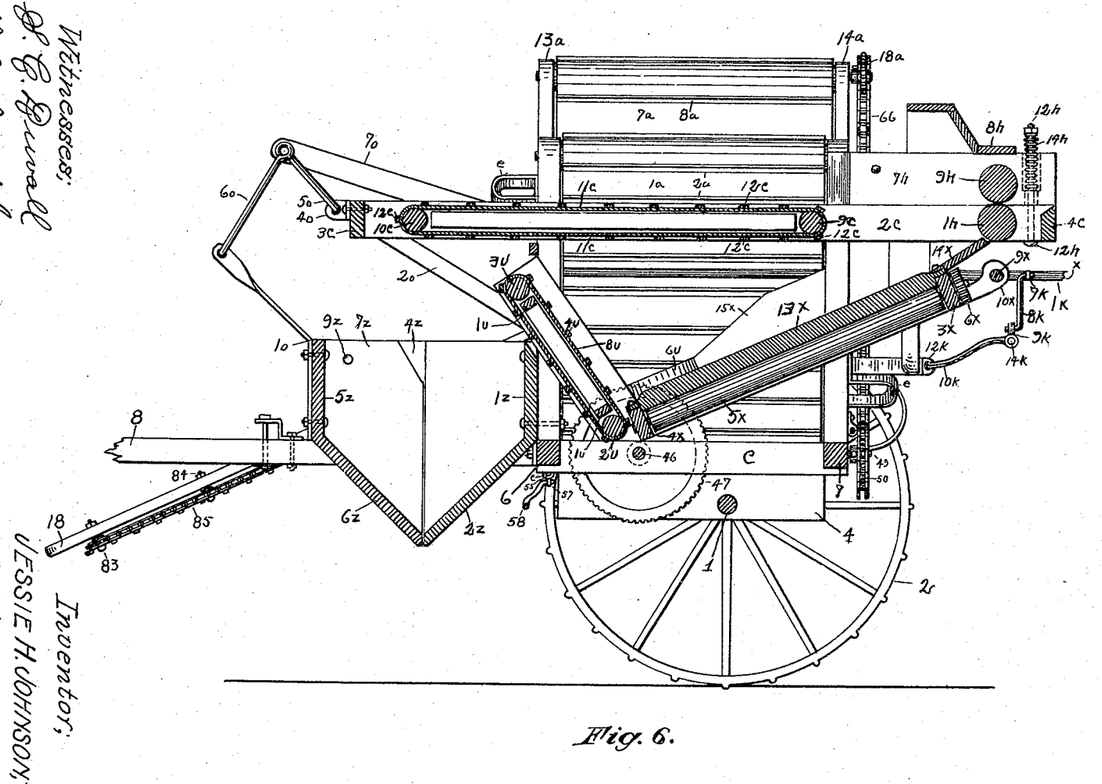
Fig. 6 is a longitudinal sectional view of my machine, taken on lines Y Y of Figs. 1 and 3.
Figure 8:
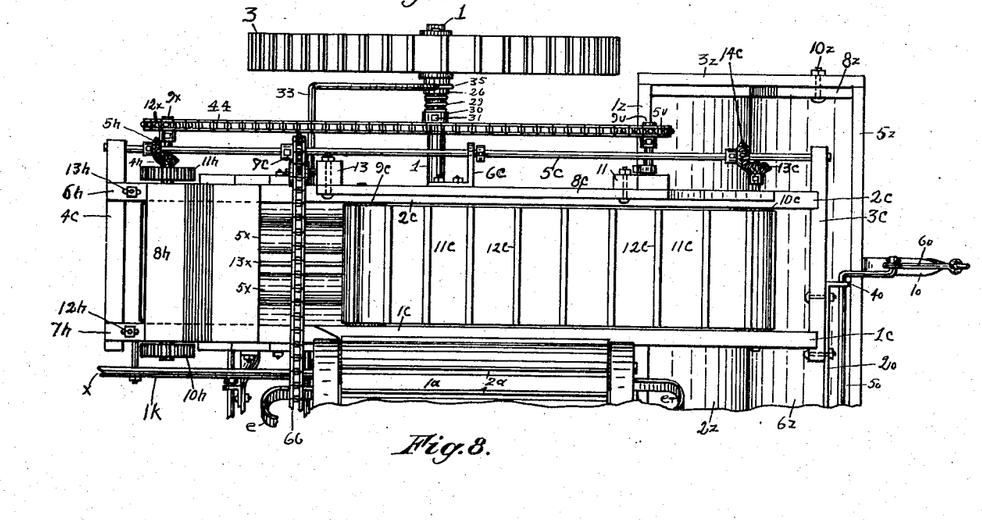
Fig. 8 is a top plan of the minor portion of my machine, and when taken in connection with Fig. 7 the two views constitute an entire top plan of the machine.

*Conveyer mechanism.*—Revolubly mounted between the members $1^c$ and $2^c$ of the above-described framework and journaled therein and parallel with the end members thereof are the two rollers $9^c$ and $10^c$, on which rollers are mounted the endless apron $11^c$, the top surface of which is adapted to travel rearward, and across said apron at frequent distances apart are secured a number of slats $12^c$. Projecting from the left end of the front roller $10^c$ is a short axle, to the end of which is secured a bevel gear-wheel $13^c$. Secured on the shaft $5^c$ at right angles to wheel $13^c$ and meshing therewith is a similar bevel gear-wheel $14^c$, by which said apron $11^c$ is carried on said rollers $9^c$ and $10^c$, as shown in Figs. 6 and 8. The endless apron just referred to is adapted to travel at right angles to the aprons 92, $1^a$, and $7^a$, with its surface parallel with the surface of apron 92, but on a much higher plane, as shown in the drawings.

*Corn-snapping mechanism.*—Mounted in and on the rear end of the frame above described is a mechanism for removing the ears of corn from the stalks, which mechanism consists of a roller $1^h$, mounted between the members $1^c$ and $2^c$ near to and forward of the cross-piece $4^c$ by the axles which extend through the members $1^c$ and $2^c$ and carrying on the outer ends of the cog-wheel $2^h$ on the right and $3^h$ on the left, the roller $1^h$ being on a level with the rollers $9^c$ and $10^c$ and is slightly larger. Secured on the same axle as the wheel $3^h$ and adjacent thereto is a bevel gear-wheel $4^h$, and meshing therewith at right angles thereto and secured on the shaft $5^c$ is a similar bevel gear-wheel $5^h$, by which the roller $1^h$ is revolved. Extending up from and resting on the top edges of the members $1^c$ and $2^c$ in the rear of the posts 13 and 14 are two members $6^h$ and $7^h$, which are united at the top by the member $8^h$, which extends upward and forward, forming a roof or covering. The forward ends of members $6^h$ and $7^h$ are hinged, to their forward top edges, to the posts 13 and 14, so that the rear end of the frame thus formed is adapted to be raised and lowered. Mounted between the members $6^h$ and $7^h$ and immediately above the roller $1^h$ is a similar roller $9^h$, contacting with the roller $1^h$. This roller $9^h$ is also provided with axles which project through the members $1^c$ and $2^c$, and to their ends are secured the cog-wheels $10^h$ and $11^h$, which latter mesh with the respective cog-wheels $2^h$ and $3^h$, located immediately below them. It is apparent that the rollers $1^h$ and $9^h$ are held normally in contact by the weight of the latter; but in order to increase the pressure I provide vertical holes through each of the members $1^c$ and $2^c$ in the rear of the roller $1^h$, through which I insert bolts $12^h$ and $13^h$, which pass up through corresponding holes in the members $7^h$ and $6^h$, where their threaded ends are provided with nuts or taps. The holes in the members $7^h$ and $6^h$, through which pass the bolts $12^h$ and $13^h$, are enlarged from the top downward a portion of the way in order to receive the coil-springs $14^h$ and $15^h$, which encircle the respective bolts just referred to and which are seated in the bottoms of said enlarged portions of the holes and contact with the under side of the respective nuts on the bolts $12^h$ and $13^h$.

It is intended that the stalks of corn which may be carried rearward on the apron $11^c$ shall be carried through between the rollers $9^h$ and $1^h$, and by which the ears of corn are to be forced from the stalk by the action of the rollers drawing on the stalks and yet not permitting the ears to pass between them. Thus the ears of corn will be severed from the stalks and will fall below onto the husking mechanism, which will hereinafter be described.

Figures 9, 10:
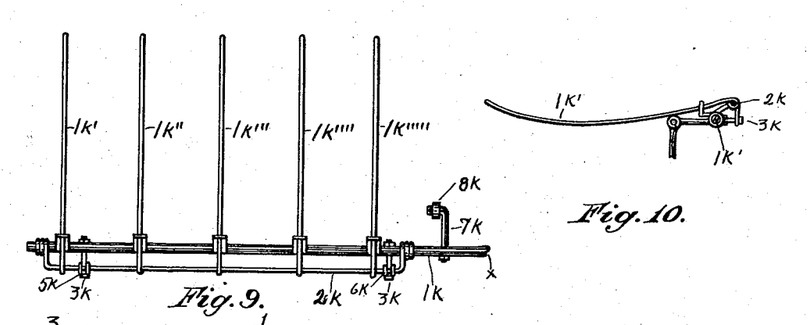
Fig. 9 is a top plan of the fodder-bunching device.
Fig. 10 is an end view of the fodder-bunching device.

*Cradle mechanism.*—The cradle is located at the rear of the machine immediately back of the snapping mechanism just described, and this device is shown in detail in Figs. 9 and 10. The main shaft of this device is shown by $1^k$, and in order to more fully understand the relative location of this device with reference to the other parts of the machine it should be supposed that the broken end $x$ of the shaft $1^k$ in Fig. 9 is united with the broken end $x$ of same shaft, as shown in Fig. 8. The prongs of the cradle are represented by $1^{k'}$, $1^{k''}$, $1^{k'''}$, $1^{k''''}$, and $1^{k'''''}$, which prongs extend to the left at right angles to the shaft $1^k$, to which they are secured. Extending parallel with the shaft $1^k$ and beyond the prongs is the rod $2^k$, with its end portions bent at right angles and then encircling the shaft $1^k$. The rod $2^k$ is prevented from sliding around on the shaft $1^k$ by the two bolts $3^k$ and $4^k$, which pass through holes in the shaft $1^k$, where they are secured by nuts on the threaded ends of said bolts, the other ends of said bolts being secured to the rod $2^k$ by rings $5^k$ and $6^k$, which pass over the rod $2^k$ and under the bolts and are prevented from slipping off by the heads of the bolts. The prongs above referred to are secured by being looped around both the shaft $1^k$ and the rod $2^k$, the inner ends being expanded and provided with holes through which pass the prongs, as shown in the drawings. The shaft $1^k$ is journaled below the braces $11^a$ and $12^a$ to the right side of the posts 12 and 14. Secured to the shaft $1^k$ between the prongs and the machine is a bolt $7^k$, which passes through a hole in shaft $1^k$, where it is secured by a nut, and then projects to the left parallel with the prongs, and the end is turned rearward at right angles to its body portion, thus forming an axle for the member $8^k$. The member $8^k$ extends down to the link $9^k$, in which it is pivotally mounted in the upper eye thereof.

Figure 7:
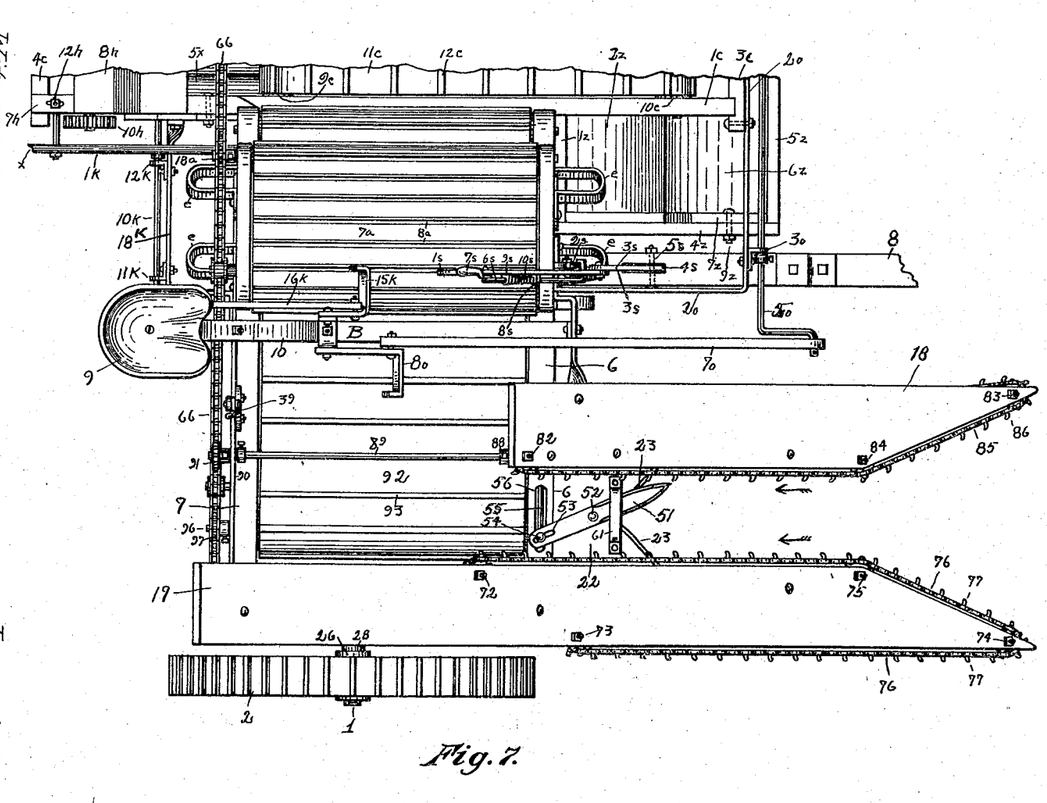
Fig. 7 is a top plan of the main portion of my machine.

$10^k$ represents a rod at right angles to shaft $1^k$, mounted in hangers $11^k$ and $12^k$, each end being bent upward at right angles thereto and then bent outward parallel therewith, forming the crank-pivots $13^k$ and $14^k$, the latter being mounted in the lower eye of the link $9^k$. Said hangers $11^k$ and $12^k$ are secured to the brace $18^k$, which latter is secured to the brace 90 and to the hanger $10^x$. Extending from the front to the rear of the machine and attached to the rear brace 90, Fig. 3, and the front brace A (which extends from and is secured to the members $16^a$ and 18, Fig. 1) is the plate B, Fig. 7, on which is mounted the post 10, which carries the driver's seat 9, the lever for operating the husked-corn receptacle, and the lever $15^k$, which operates the cradle.

Pivotally secured to the lever $15^k$ near its upper portion by a bolt is the connecting-arm $16^k$, which latter is provided with a hole in its lower end in which is journaled the crank $13^k$. Secured to the lower end of $16^k$, extending to and secured near the lower end of 14, Fig. 3, is a coil-spring $17^k$, whose tension is sufficient to retain the prongs of the cradle in their extended normal position, as shown in the drawings.

It will be apparent that the fodder after passing between the rollers $1^h$ and $9^h$ will be deposited on the prongs of the cradle just described, and when a desired amount of fodder has been collected on said prongs the driver has only to release the lever $15^k$, which will cause the shaft $1^k$ to make a quarter-turn, which operation will cause the prongs of the cradle to all turn downward at right angles to their normal position, and the bunch of fodder contained on them will be dropped to the ground, after which the mechanism is returned to its normal position and is ready to collect another bunch of fodder.

*Husking mechanism.*— As the unhusked ears of corn are removed from the stalks they fall down onto the husking mechanism, which I will now describe.

I provide a frame consisting of the two parallel side pieces $1^x$ and $2^x$, and upper end $3^x$, and a lower end $4^x$. This frame is of an outside width the same as the distance between the posts 13 and 14, to which they are secured near the perpendicular centers of the latter. The forward end of said frame rests on the sill 5 and on an auxiliary sill C, which latter extends between the sills 6 and 7, opposite to the posts 12 and 14, at a point directly above the shaft 46. The upper end of the said frame is supported by the posts 13 and 14, as stated, beyond which it projects to the rear. Mounted longitudinally in said frame on a level with each other and occupying the space between the sides of the frame and contacting with each other are a series of four rollers $5^x$, their lower forward ends being pivotally mounted in the end piece $4^x$ of the frame and their upper ends being pivotally mounted in the end piece $3^x$. The axles of the upper ends of the said rollers extend through and beyond the end piece $3^x$, where said axles are each provided with gear-wheels $6^x$, meshing with each other, as shown. The upper axle of the left roller extends slightly farther rearward than do the other axles, and to this extension is secured the miter gear-wheel $7^x$, which latter meshes with the miter gear-wheel $8^x$, set at right angles to $7^x$, and is secured on the shaft $9^x$. Extending to the rear from the upper corners of said frame are two hangers $10^x$ and $11^x$, in which is revolubly mounted said shaft $9^x$, which latter extends to the left, where it has secured to it the sprocket-wheel $12^x$. The sprocket-wheel $12^x$ is on alinement with the sprocket-wheel 43, Fig. 2, and is connected thereto and operated thereby by the sprocket-chain 44. The upper surfaces of the rollers, arranged and geared as above stated, will provide two husk-gathering channels, one between each pair of rollers; but the center channel will present a surface operating upward, and consequently will not be capable of doing work. Therefore to prevent the ears of corn from lodging in the center channel I have provided a divider $13^x$, Fig. 5, which will not allow the corn to become lodged in said channel, but will compel it to lodge in one of the other channels, to be husked. The divider $13^x$ extends the full length of the frame and is secured to the centers of the upper edges of the ends $3^x$ and $4^x$, as shown. Extending from near the under side of the roller $1^h$ to the upper edge of the member $3^x$ of the frame is a guide-board $14^x$, which is secured to the latter, and this prevents the corn from falling onto the wheels $6^x$ and also guides the corn onto the rollers $5^x$. The sides $1^x$ and $2^x$ of the frame are provided with side-boards $15^x$ and $16^x$ to prevent the corn from passing over the sides of the frame. It will now be seen that the rollers $5^x$ will be turned in unison and that the unhusked ears of corn falling on the upper ends thereof will be turned parallel with the rollers and, on account of the inclination, will gradually work to the lower ends of said rollers, and, further, that the husks on the ears of corn will be grasped between the rollers and removed thereby, and the husks will fall below the machine and the ears of corn will continue to the end of the incline, where they will be taken up by an elevating mechanism which will hereinafter be described.

Figure 2:
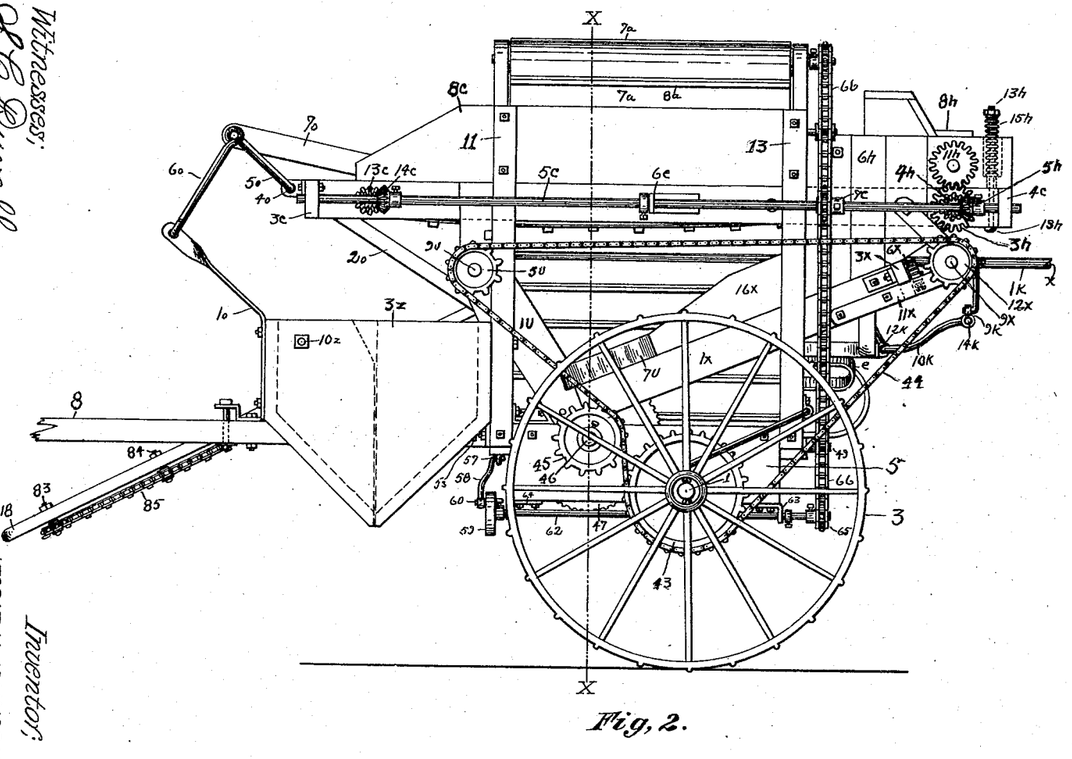
Fig. 2 shows a left-hand side elevation of my machine.

*Mechanism for elevating the husked corn.*—This device consists of a frame $1^u$, of substantially half the length and width of the husking device and lies at right angles thereto, and their lower ends are secured near each other, and this elevating device extends upward and forward from the center of the lower end of the husking device. The lower or rear end of the elevator is secured opposite to the center of the lower end of the husking device, as stated, and then extends upward and forward at an incline between and beyond the posts 11 and 12. The side members of this frame extend beyond its cross members, and between these ends are mounted the rollers $2^u$ and $3^u$. On these rollers I mount an endless apron $8^u$, which is provided with slats $4^u$, secured across it at frequent distances apart. Each end of the said rollers is provided with axles which operate in the sides of the frame, and the left axle $9^u$ of the roller $3^u$ extends out beyond the side of the frame, where it has secured to it a sprocket-wheel $5^u$, the latter being on alinement with the sprocket-wheel 43 and is operated by the sprocket-chain 44, extending therefrom, as shown in Fig. 2. This elevator being only half of the width of the husking-frame from which it receives the corn, therefore in order to concentrate the corn to the receiving end of the elevator I provide the two guards or guides $6^u$ and $7^u$, which form a throat, and thus reducing the width of the husking-frame to the width of the elevator.

As the husked corn is delivered at the lower ends of the husking-rollers it is taken up by the elevator just described and carried upward and forward by the apron $8^u$ and delivered in a receptacle provided for that purpose, which I will now describe.

*Husked-corn receptacle.*—The receptacle in which the husked corn is deposited from the elevator just described and by which the corn can be measured and deposited on the ground in gavels is secured to the forward sides of the posts 11 and 12, and it consists of a rear portion $1^z$, secured to said posts with the angle portion $2^z$, which forms one-half of the bottom of same length and extending downward and forward therefrom at an obtuse angle, the portions $3^z$ and $4^z$ forming end members with their lower portions V-shaped. The above-named parts are stationary and are securely fastened together. The opposite part of the receptacle consists of the front member $5^z$, of similar dimensions and directly in front of the corresponding member $1^z$. Secured to the lower edge of said member $5^z$ and extending downward and rearward therefrom at an obtuse angle is the member $6^z$, which forms the forward half of the slanting bottom. Secured on the inside of the members $5^z$ and $6^z$, at their extreme right and left ends, respectively, are the members $7^z$ and $8^z$, which lie close to and parallel with the forward portions of the end members $3^z$ and $4^z$, to which they are pivotally connected by the bolts $9^z$ and $10^z$.

By the construction just described it is seen that I provide a receptacle with a V-shaped bottom, by which the forward portion may be swung away from the rear portion, so that the contents of the receptacle will be deposited on the ground or into a removable receptacle, if desired. The operation of this device can be controlled by the driver of the machine from his position on the seat 9 by means of the following-described mechanism:

*Mechanism for operating the husked-corn receptacle.*—Perpendicularly secured on the outside of the center of the member $5^z$ is a bar or flat section of metal $1^o$, which after following the front face of said member $5^z$ to its top edge is bent to the rear and given a quarter-twist and at its outer end is provided an eye therethrough. (Shown in Fig. 1.)

Figure 1:
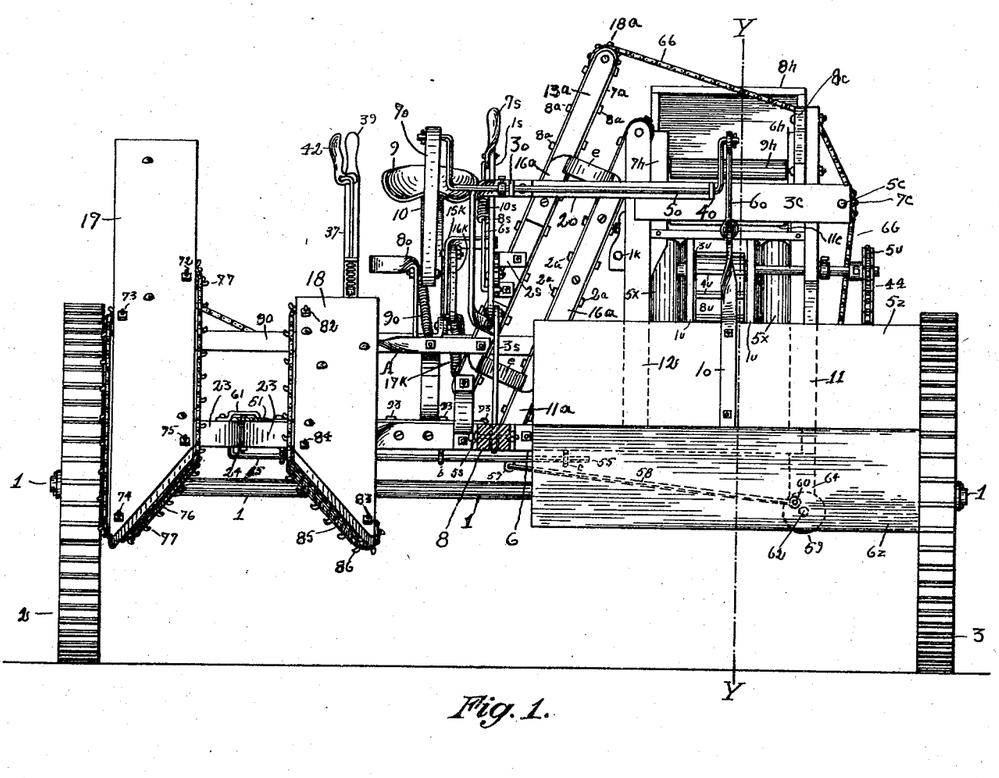
Figure 1 shows a front elevation of a machine embodying my invention.

$2^o$ represents a stationary member of metal parallel to the member $3^c$, heretofore referred to, and its left end is secured thereto and from which it projects to the right, where it is bent at right angles to the rear and downward and is secured to the member $13^z$, as shown in Fig. 1. Projecting forward from the horizontal portion of $2^o$ are two hangers $3^o$ and $4^o$, in which are openings to receive the rod $5^o$. The right end portion of $5^o$ is bent upward and rearward at right angles, and then a short axle portion is bent parallel to the body portion. Said axle is mounted in the hole in the top of link $6^o$, and the lower end of said link $6^o$ is loosely secured in the hole in the top of the member $1^o$. The right end portion of the rod $5^o$ is also bent upward and rearward at right angles to the body portion, and the extreme end is then bent parallel with the body portion to form an axle for the member $7^o$, which latter extends rearward and downward, and its rear end is pivotally mounted to the side of the lever $8^o$. The lower end of the lever $8^o$ is secured to the cross member B near the lever $15^k$. Secured to the lever $8^o$ near where the member $7^o$ is secured thereto and extending forward and slightly downward and secured near the forward end of the member B is a coil-spring $9^o$, the tension of which operating on the mechanism just described is sufficient to normally retain the lower edges of the members $2^z$ and $6^z$ in contact with each other.

Figure 4:
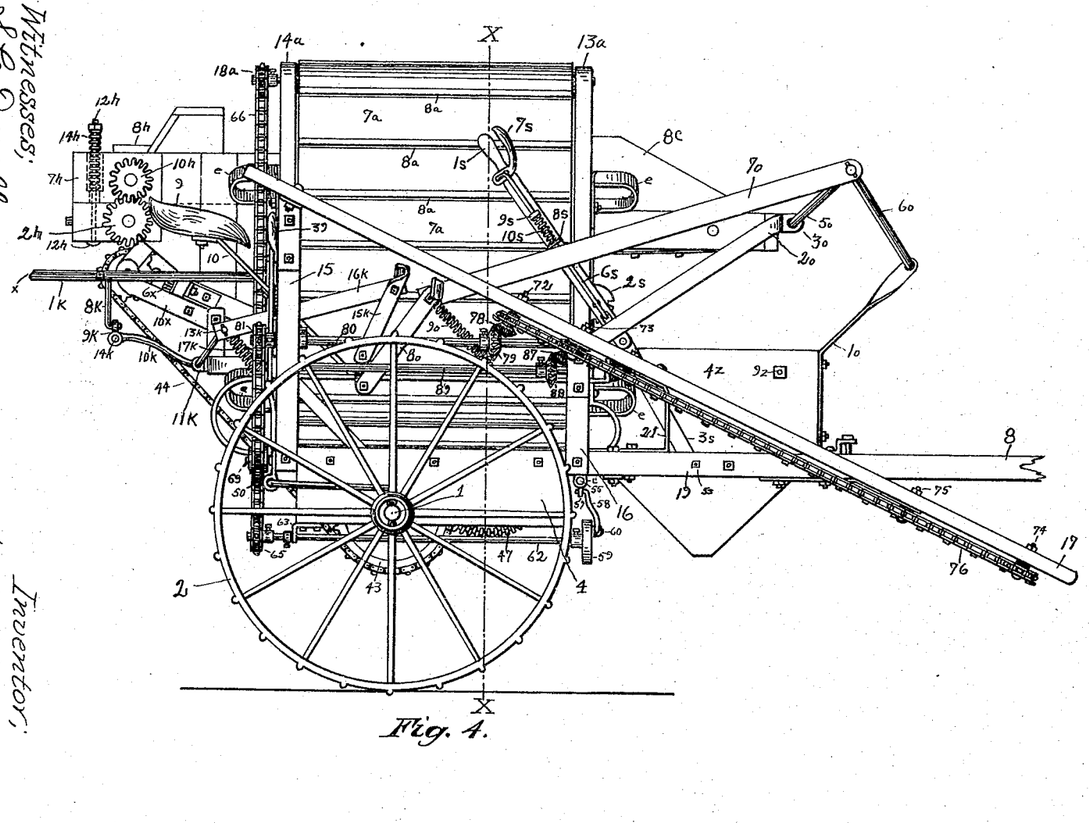
Fig. 4 shows a right-hand elevation of same.

*The draft.*—My machine is primarily intended to be drawn by horses or other animals, and for this purpose I provide a tongue 8, which extends forward from the center of the machine and is secured to the center of the sill 6 by means of hangers extending out from said sill and a sufficient distance apart to receive the tongue between them and with a bolt passing laterally through said hangers and through the end of the tongue, thus allowing the tongue to have a vertical movement, but not a lateral movement. The vertical movement of the tongue 8 is controlled by a lever $1^s$, which projects upward in front of the driver's seat 9 from the hanger $2^s$, where it is pivotally mounted. Said hanger is secured to the member $13^a$, as shown in Fig. 1. The lower end of the lever $1^s$ projects downward beyond the hanger $2^s$, where it is pivotally secured to the upper end of the member $3^s$, which latter extends forward and downward to the tongue 8, where it is pivotally mounted in a slot $4^s$ by the bolt $5^s$, Fig. 7. The outer circular edge of the hanger $2^s$, Fig. 4, is provided with a rack adapted to receive in the notches thereof the plunger formed on the lower end of the rod $6^s$, which latter extends along the side of the lever $1^s$ to near its top, where it is provided with the grip $7^s$, by which it is operated parallel with the lever $1^s$, so that the plunger at its lower end may be engaged with or released from the rack on the hanger $2^s$. The rod $6^s$ passes through a guide $8^s$, secured to the side of the lever $1^s$, and above said guide, secured around the rod $6^s$, is a nut or stop $9^s$. Between the guide $8^s$ and the nut $9^s$, encircling the rod $6^s$, is a coil-spring $10^s$, which is adapted to retain the plunger on the end of the rod $6^s$ normally in contact with one of the notches in the rack on the edge of the hanger $2^s$. By this arrangement the driver can operate the lever $1^s$ for lowering or raising the forward portion of the machine without disturbing the vertical position of the forward end of the tongue 8.

Operation: Having now fully described the construction of my machine and the essential details thereof, I will now give a brief outline of its operation.

The various operations of the machine follow each other in progressive sequence in substantially the order in which the various mechanisms have been described. This machine is intended to harvest but a single row of corn at each travel across a field; but it is evident that the capacity of the machine may be doubled to harvest two rows of corn at a time by providing a duplicate cutting and elevating mechanism to be located at the left of the side of the machine and in juxtaposition thereto by doubling the capacity of the snapping and husking mechanisms.

The machine should be brought to the field in which it is intended to be operated with the mechanism out of gear—that is, with the lever 39 to the right—and after the machine is in position to begin work the lever 39 should be placed in the position shown in the drawings, which will place the machine and its various mechanisms in gear and cause the various parts to operate as the machine moves forward over the ground. The machine should be moved forward so that the row of corn to be cut will come between the guard-boards 17 and 18 and be drawn into the vortex 24 by the spurs 77 and 86, as above described. The knife 51 will be operated laterally at a high rate of speed and will sever the stalks of corn at the height to which the machine is set, (preferably about half-way up the stalk.) As the stalks are severed they will fall to the rear onto the apron 92 and be carried thereby to the left thereof, where they will be taken up between the aprons and deposited onto the apron $11^c$, which latter will carry the stalks endwise to the rollers $1^h$ and $9^h$, between which the stalks will be drawn by said rollers, and the unhusked ears of corn will be severed from the stalks, as heretofore stated, the fodder passing to the rear between said rollers onto the cradle, and the ears of corn will fall onto the husking-rollers and the husks removed therefrom in the manner heretofore set forth. Arriving at the lower forward ends of the husking-rollers, the ears of corn will be taken up by the elevator and deposited in the receptacle, as described, for that purpose. When the corn-receptacle has become full of corn, the driver has only to pull rearward on the lever $8^o$, which will cause the member $6^z$ of the receptacle to swing forward away from the stationary member $2^z$, and the corn in the receptacle will thus be allowed to fall to the ground, and on the lever $8^o$ being released the spring $9^o$ will return the member $6^z$ to its normal position. When a sufficient amount of fodder has collected on the cradle in the rear, the driver has only to pull rearward on the lever $15^k$, which will cause the prongs of the cradle to turn downward at right angles to their former position, which will allow the bunch of fodder to fall to the ground, and on the lever $15^k$ being released the prongs of the cradle will return to their normal position by the action of the spring $17^k$. As the various mechanisms operate and complete their functions the machine proceeds forward, and the various operations are repeated, as described.

Having thus described my invention, what I claim as new, and desire to secure by Letters Patent, is—

1. In a corn-harvester, the combination, with the cutting apparatus and the endless conveying-apron receiving the stalks from the cutting apparatus and traveling transversely to the path of movement of the machine, of elevating mechanism comprising two parallel endless aprons placed at an incline with respect to the conveying-apron and receiving the stalks therefrom, a conveyer-apron receiving the stalks from the elevating-aprons, snapping-rollers arranged at the delivery end of the conveyer or apron and receiving the stalks therefrom, husking mechanism disposed at an angle below the conveyer-apron and receiving the unhusked ears of corn from the snapping-rollers, mechanism for elevating the husked ears of corn comprising an endless apron disposed at an incline at the lower end of the husking mechanism, and a receptacle to receive the ears of corn from said latter mechanism, substantially as set forth.

2. In a corn-harvester, the combination, with the cutting apparatus and the endless conveying-apron receiving the stalks from the cutting apparatus and traveling transversely to the path of movement of the machine, of elevating mechanism comprising two parallel endless aprons placed at an incline with respect to the conveying-apron and receiving the stalks therefrom, a conveyer-apron receiving the stalks from the elevating-aprons, snapping-rollers arranged at the delivery end of the conveyer or apron, and receiving the stalks therefrom, husking mechanism disposed at an angle below the conveyer-apron and receiving the unhusked ears of corn from the snapping-rollers, mechanism for elevating the husked ears of corn comprising an endless apron disposed at an incline at the lower end of the husking mechanism, a receptacle to receive the ears of corn from said latter mechanism, said receptacle having a swinging portion, and means for operating the swinging portion to discharge the ears of corn from the receptacle, substantially as set forth.

3. In a corn-harvester, the combination with the cutting apparatus, and the endless conveying-apron receiving the stalks from the cutting apparatus and traveling transversely to the path of travel of the machine, of stalk-elevating mechanism comprising a pair of parallel inclined conveying-aprons moving in unison and operated independently, a conveyer mechanism comprising an endless apron traveling in the direction of the path of movement of the machine, and receiving the stalks from the elevating-aprons, snapping-rollers arranged at the delivery end of the conveyer-apron with the top of the lower roller in the same plane as the upper surface of the conveyer-apron, husking mechanism disposed at an incline below the conveyer-apron and snapping-rollers and receiving the unhusked ears of corn from the snapping-rollers, a cradle located below and at the delivery end of the snapping-rollers and receiving the fodder or stalks as discharged from said snapping-rollers means for operating the cradle to discharge the fodder or stalks therefrom, an elevating mechanism for the husked ears of corn comprising an endless apron disposed at an incline at the lower end of the husking mechanism, and receiving the husked ears of corn therefrom, and a receptacle disposed to receive said husked ears of corn from said apron, substantially as set forth.

In testimony whereof I affix my signature in the presence of two subscribing witnesses.

JESSIE H. JOHNSON.

Witnesses:
R. W. RANDLE,
S. C. DUVALL.